US009169908B2

(12) United States Patent
Garrec

(10) Patent No.: US 9,169,908 B2
(45) Date of Patent: Oct. 27, 2015

(54) ASYMMETRICAL ANTI-ROTATION DEVICE AND SCREW JACK COMPRISING SUCH A DEVICE

(71) Applicant: COMMISARIAT A L'ENERGIE ATOMIQUE ET AUX ENERGIES ALTERNATIVES, Paris (FR)

(72) Inventor: Philippe Garrec, Gif-sur-yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/349,045

(22) PCT Filed: Oct. 12, 2012

(86) PCT No.: PCT/EP2012/070334
§ 371 (c)(1),
(2) Date: Apr. 1, 2014

(87) PCT Pub. No.: WO2013/057058
PCT Pub. Date: Apr. 25, 2013

(65) Prior Publication Data
US 2014/0245846 A1 Sep. 4, 2014

(30) Foreign Application Priority Data

Oct. 17, 2011 (FR) ...................... 11 59354

(51) Int. Cl.
*F16H 25/24* (2006.01)
*F16H 25/20* (2006.01)
*F16H 19/06* (2006.01)

(52) U.S. Cl.
CPC ............... *F16H 25/24* (2013.01); *F16H 19/06* (2013.01); *F16H 25/20* (2013.01); *F16H 2025/204* (2013.01); *F16H 2025/2081* (2013.01); *F16H 2025/2096* (2013.01); *Y10T 74/18648* (2015.01)

(58) Field of Classification Search
CPC ......... B25J 9/104; B25J 9/1045; F16H 25/24; F16H 19/16; F16H 25/20; F16H 2025/204; F16H 2025/2043; F16H 2025/2034; F16H 7/18; F16G 13/16; B23Q 5/408; F04B 47/02
USPC ........ 74/490.01, 490.04, 490.05, 89.2, 89.22, 74/89.23, 89.32, 89.33, 89.36, 502.6; 901/19, 21; 474/144, 145
See application file for complete search history.

(56) References Cited

U.S. PATENT DOCUMENTS 3,739,648 A * 6/1973 Payst .............................. 74/89.2
7,574,939 B2 * 8/2009 Garrec ....................... 74/490.03
(Continued)

FOREIGN PATENT DOCUMENTS

EP 0 315 310 A1 5/1989
FR 2 941 760 A1 8/2010
(Continued)

OTHER PUBLICATIONS
International Search Report for PCT/EP2012/070334 dated Nov. 7, 2012.

*Primary Examiner* — William Kelleher
*Assistant Examiner* — Bobby Rushing, Jr.
(74) *Attorney, Agent, or Firm* — Sughrue Mion, PLLC

(57) ABSTRACT

The invention relates to an anti-rotation device for preventing the rotation of a driven element (4) about a longitudinal axis (Ox), said device comprising: a cross-piece (7) guided in a planar manner on a longitudinal plane parallel to the longitudinal axis of the screw by guiding means (8) that block the rotation of the guiding cross-piece (7) about the longitudinal axis, while allowing the rotation of the guiding cross-piece (7) about two axes perpendicular to the longitudinal axis and perpendicular to one another; and a coupling member (6) at one end of the driven element (4), connected to the guiding cross-piece (7) by linking means that permit a sliding connection (5), the axis (5) of which does not converge with the longitudinal axis. The invention also relates to a screw jack and a cable jack comprising such a device.

10 Claims, 2 Drawing Sheets

(56) References Cited

U.S. PATENT DOCUMENTS

2010/0170357 A1* 7/2010 Kim et al. .................... 74/89.32
2011/0056321 A1* 3/2011 Sim et al. .................... 74/490.04
2011/0167945 A1* 7/2011 Yang et al. ................. 74/490.04

FOREIGN PATENT DOCUMENTS

| FR | 2 949 451 A1 | 3/2011 | |
| WO | WO 2004082901 A1 * | 9/2004 | ................. B25J 9/10 |
| WO | WO 2011026621 A1 * | 3/2011 | |

* cited by examiner

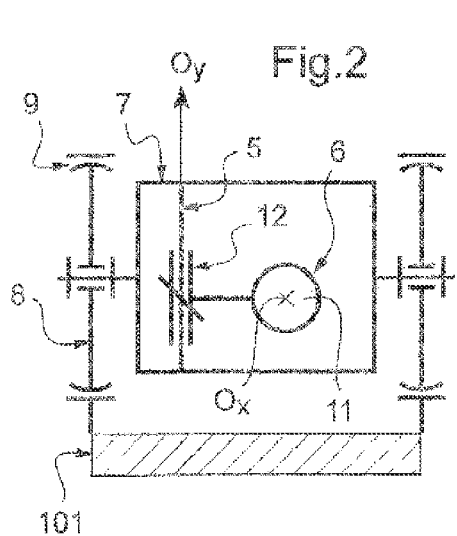
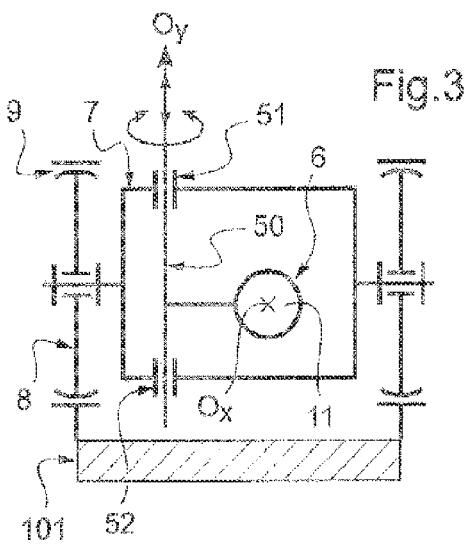
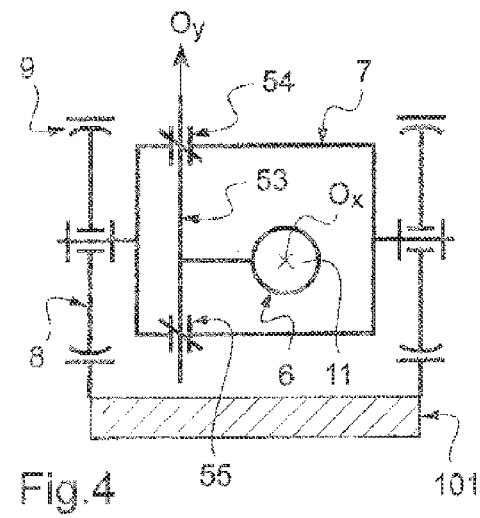
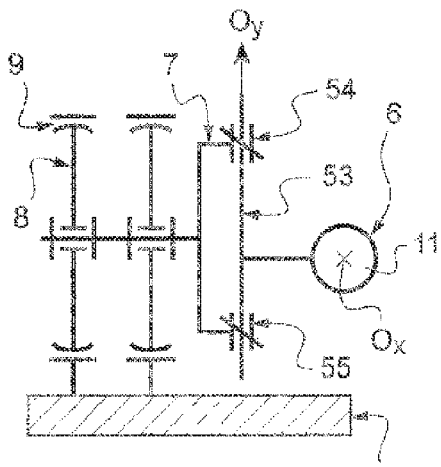
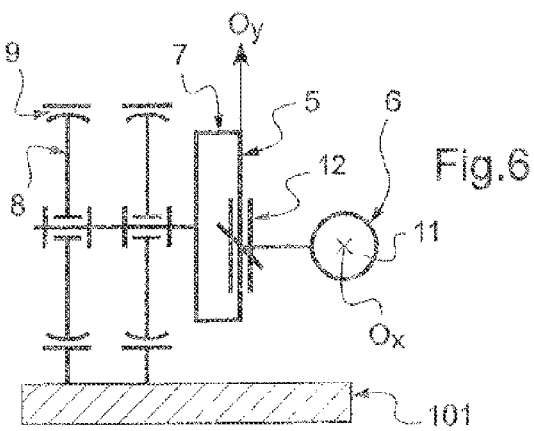

ASYMMETRICAL ANTI-ROTATION DEVICE AND SCREW JACK COMPRISING SUCH A DEVICE

CROSS REFERENCE TO RELATED APPLICATIONS

This application is a National Stage of International Application No. PCT/EP2012/070334 filed Oct. 12, 2012, claiming priority based on French Patent Application No. 11 59354 filed Oct. 17, 2011, the contents of all of which are incorporated herein by reference in their entirety.

DOMAIN OF THE INVENTION

The present invention relates to an anti-rotation device of an element driven by a linear drive system about a longitudinal drive axis. The invention also relates to a screw jack and a cable jack comprising such a device.

PRIOR ART

Various different linear cable actuators are known. Windlass systems comprise a drum around which a cable is wound. Block and tackle systems frequently include a motorized drum that, acting on a pulley block, steps up the traction force applied by the drum to the output cable of the system. Finally, cable jacks comprise a system for driving a cable loop arranged between two pulleys. The object to which the linear movement is to be communicated is attached to the driven cable or to another cable loop moved by pulleys rigidly attached to the pulleys bearing the driven cable. Cable jack systems provide a reliable force on account of the ability thereof to perform a given movement in one direction or in another direction while requiring the same energy regardless of the direction of movement. Cable jacks also enable the use of a motor with an axis of rotation parallel to the axis of the driven cable. Consequently, this system has an energy efficient transmission angle (low friction losses), which explains the preferred use thereof in robotics, in particular for the articulations of mechanical arms.

Cable jacks are preferred for applications that require reduced weight, precise feedback or the non-use of fluids. This type of jack is in particular used for applications such as remote operation, orthotics or exoskeletons.

Cable jacks work by longitudinally driving an element rigidly attached to a cable. The drive is conventionally provided by a screw-nut system. A motor is attached to the nut cooperating with the screw that forms the driven element of the system. The drive axis of this screw is the longitudinal axis of the system. A guide yoke bears the anti-rotation means about the longitudinal axis such that rotation of the nut causes a translational movement of the screw. For the sake of compactness, the driven screw is usually a hollow screw through which the driven cable passes. In order to eliminate internal system vibrations, which cause parasitic drag and bending movement on the screw, the guide yoke provides a linear guide for the screw along the longitudinal axis. The guide yoke is linked to the screw by a coupling member.

Consequently, the guide yoke provides a slide link along the longitudinal drive axis. Rotation about the axes perpendicular to the longitudinal axis and perpendicular to one another, as well as the translational movements along these same axes must be authorized by the guide system to ensure they do not generate vibrations The functions of coupling the screw to the guide yoke, guiding in translational movement and preventing rotation are frequently combined in a single kinematic unit referred to as a "trolley". The trolley has a frame to which the different elements are attached. Known guiding solutions usually use systems of rollers intended to longitudinally guide the guide yoke within a frame rigidly connected to the screw-nut system. The rollers cooperate with longitudinal slots formed in the frame that extend on either side of the drive axis of the screw. These slots both guide translational movement along the longitudinal axis and prevent rotation about the longitudinal axis. They also allow the trolley to move freely in translation along an axis perpendicular to the plane of the guide slots. This provides a linear guide that prevents rotation of the screw about the longitudinal axis thereof, guiding the screw along the longitudinal axis and enabling movement along an axis perpendicular to the plane of the guide slots. The trolley also includes a coupling member connecting the drive screw to the guide yoke. The coupling may be a "½ Oldham" or "bellows" coupling. In order to limit vibration within the system, it is important to enable the screw to move freely in relation to the trolley along an axis parallel to the plane of the guide slots and perpendicular to the longitudinal axis. A known solution involves linking the coupling member to the trolley frame using a link that enables this translational movement. In practice, this solution uses two shafts arranged on either side of the coupling member that intersect with the longitudinal axis. The miniaturization and size requirements of the mechanisms prevent the use of two standard machined units, such as splined shafts, that enable translational movement and prevent rotation. Known embodiments therefore use short smooth shafts that are difficult to align and therefore have significant clearance to enable a satisfactory sliding movement. As a result, the rotation of the coupling about an axis parallel to the plane of the guides slots and perpendicular to the longitudinal axis is not prevented. Furthermore, these systems are voluminous and the required clearance results in extraneous vibrations that have a significant impact on the precision required for use in exoskeletons, orthoses or remote control, for example. Another solution involves articulating the frame provided with guide slots about an axis perpendicular to the drive shaft. However, this solution does not enable the overall size of the mechanism to be reduced, and creates a significant oscillating mass that is liable to generate vibrations, resonance and noise. As such, the known solutions involve mechanisms with significant moving masses or operating clearances that are incompatible with applications for which fine precision is sought. Furthermore, the sliding function of the guide yoke in relation to the frame is provided by non-standard parts that have a negative impact on manufacturing costs.

PURPOSE OF THE INVENTION

One objective of the invention is to improve operation of the guide yoke and to reduce the size in relation to the known solutions.

DESCRIPTION OF THE INVENTION

For this purpose, an antirotation device of an element driven about a longitudinal axis while enabling the driven element to move freely along this axis is provided, the device comprising:

a yoke guided flat along a longitudinal plane parallel to the longitudinal axis of the screw using guide means that prevent the guide yoke from rotating about the longitudinal axis and that enable the guide yoke to rotate about two axes perpendicular to the longitudinal axis and perpendicular to one another;

a coupling member at one extremity of the driven element, the coupling member being linked to the guide yoke using linking means that enable a sliding link along a sliding axis substantially perpendicular to the longitudinal axis.

According to the invention, the sliding axis between the coupling member and the guide yoke does not intersect with the longitudinal axis.

This solution enables the sliding link between the guide yoke and the coupling to be provided by a one-piece shaft, enabling cheapest standard solutions to be used and reducing clearances. This solution also enables inclusion of a link that prevents rotation of the coupling about an axis parallel to the plane of the guide slots and perpendicular to the longitudinal axis. This link may advantageously be provided by a splined recirculating-ball shaft, both ends of which are embedded in the chassis of the guide yoke. Indeed, this type of standard shaft enables only limited clearances. Furthermore, preventing rotation degree of freedom obviates the risk of untimely turning of the yoke and unwanted random contact between parts.

A screw jack fitted with this device will benefit from reduced vibrations in the driven screw, reduced manufacturing costs and reduced size. The same advantages apply to cable jacks built using such a screw jack.

Other features and advantages of the invention are set out in the following description of specific, nonlimiting embodiments of the invention.

SHORT DESCRIPTION OF THE FIGURES

Reference is made to the attached figures, in which:

FIG. 2 is a kinematic diagram of the embodiment in FIG. 1;

FIGS. 3 to 6 are kinematic diagrams of cross-sections of different possible embodiments of an anti-rotation device according to the invention.

DETAILED DESCRIPTION OF AT LEAST ONE EMBODIMENT OF THE INVENTION

Figure 1:
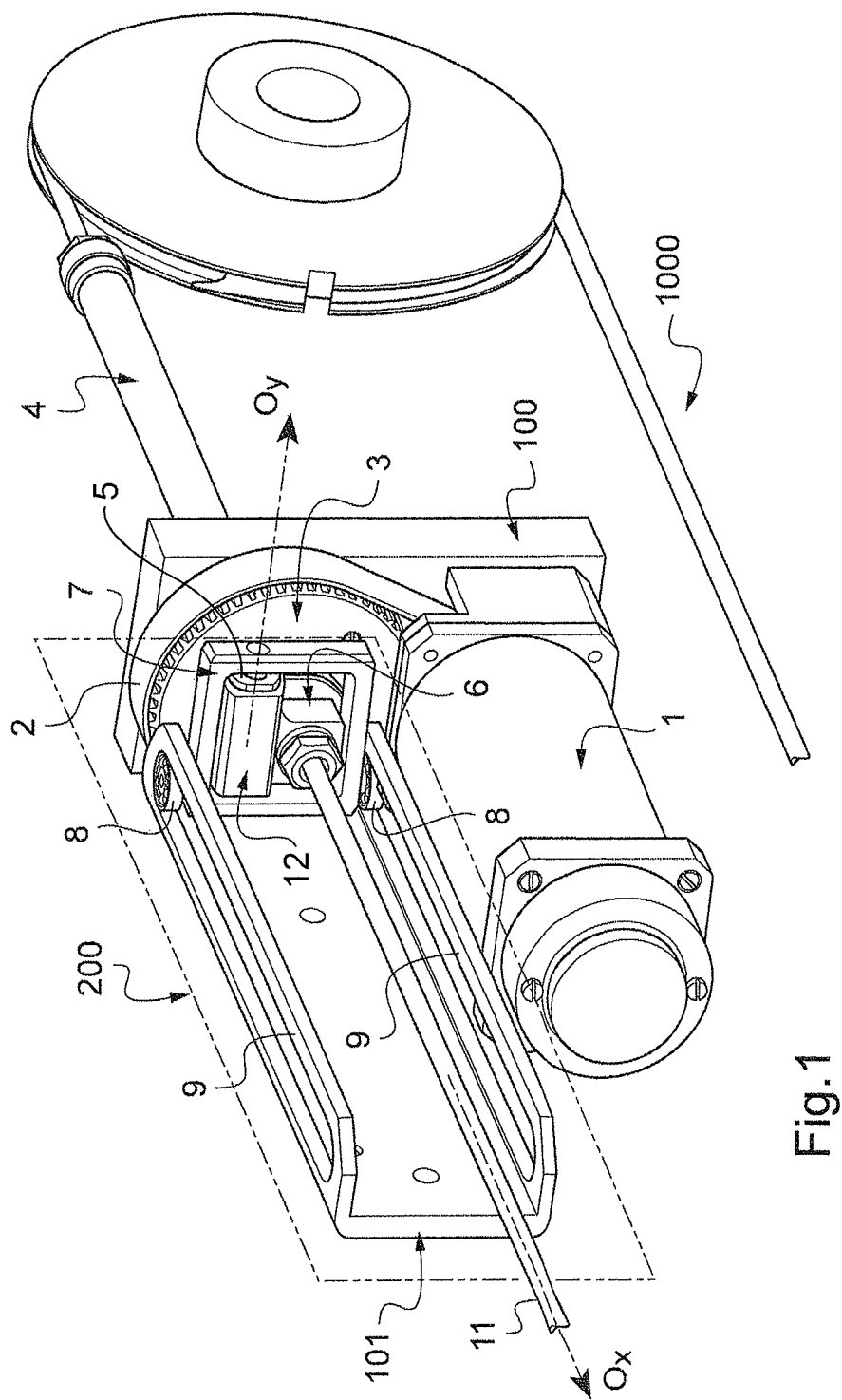
FIG. 1 is a partial perspective view of a cable jack incorporating an anti-rotation device according to the invention.

With reference to FIG. 1, the anti-rotation device according to the invention is built into a cable jack 1000. This includes a motor 1 driving a notched belt 2 that rotates a driving nut 3. The motor 1 and the driving nut 3 are mounted on a frame 100. The driving nut 3 cooperates with a hollow screw 4 through which passes a cable 11 attached to the hollow screw 4. In this case, this latter runs along a longitudinal drive axis Ox. It is prevented from rotating about this axis by an anti-rotation device 200 comprising a substantially square guide yoke 7 fitted with a pair of rollers 8 located on either side of the guide yoke 7 and running in two oblong guide slots 9. The oblong slots 9 are formed in the flanges of a plate 101, which is U-shaped in this case. The plate 101 is rigidly attached to the frame 100 parallel to the longitudinal axis Ox. The guide yoke 7 includes a coupling member 6 for coupling to the hollow screw 4, said coupling member being slidingly linked along an axis perpendicular to the longitudinal axis Ox and parallel to the plane of the guide slots by a socket 12 sliding along a shaft 5. According to one preferred embodiment of the invention, the shaft 5 is a splined recirculating-ball shaft.

Thus, a rotation of motor 1 drives the driving nut 3 in rotation via the notched belt 2, and causes the translational movement of the hollow screw 4 along the longitudinal axis Ox because the rotation thereof about this same axis is prevented by the anti-rotation device 200. The movement of the cable 11 rigidly attached to the hollow screw 4 is used to provide fine movement of the object to which movement is to be transmitted.

FIG. 2 provides greater detail of the operation of the anti-rotation device 200. In this specific embodiment, the rollers 8 are located on either side of the guide yoke 7 and run in guide slots 9. These slots prevent rotation about the axis Ox. The guidance thus provided is planar, as the contact between the guide rollers 8 and the slots 9 thereof enable movements in a direction perpendicular to the longitudinal axis Ox and parallel to the axes of rotation of the rollers 8. The guide plane along which the yoke is guided planar is therefore parallel to the longitudinal axis of the screw. The relative sliding of the rollers in the slots thereof provides a degree of rotational freedom along an axis Oy perpendicular to the longitudinal axis Ox parallel to the plane of the guide slots 9, as well as a movement of the guide yoke in a direction perpendicular to the plane of the guide slots 9.

The splined recirculating-ball shaft 5 is rigidly linked to the guide yoke 7 and forms a sliding link in the direction Oy between the guide yoke 7 and the coupling member 6 rigidly attached to the sockets 12 sliding along the shaft 5. This latter is located close to the coupling member 6 such that the sliding axis Oy thereof does not intersect with the longitudinal axis Ox. The splines of shaft 5 prevent the coupling member 6 (and therefore the hollow screw 4 to which it is rigidly attached) from rotating about the axis Oy in relation to the frame 101. The sliding link is therefore a sliding linkage. The removal of this redundant degree of freedom obviates the risk of untimely turning of the yoke and unwanted random contact between parts.

The use of a splined recirculating-ball shaft 5, which is known to have limited clearance or no clearance if the mechanism is preloaded, improves the overall precision of the anti-rotation device 200 and of the jack 1000 that it is fitted to. The ability to use a one-piece sliding element eliminates the alignment problems of the prior art. Splined recirculating-ball shafts are standard manufactured parts. Replacing made-to-measure machined parts with such manufactured parts when manufacturing cable jacks 1000 helps to reduce the manufacturing costs of these latter while improving quality.

The same reference signs are used for the elements in the description below of four other embodiments that are identical or similar to those previously described.

In another embodiment of the anti-rotation device 200 described in FIG. 3, the sliding link is a sliding pivot link provided, for example, by a smooth shaft 50 cooperating with two sockets 51 and 52 rigidly connected to the guide yoke. This link enables rotation about the axis Oy and correspond therefore to a sliding pivot link. The other functions of the anti-rotation device 200 are performed using means identical to those in the preceding embodiment described in relation to FIGS. 1 and 2. This second embodiment enables clearance to be reduced by using a single shaft 50 to provide the sliding link-in the form of a sliding pivot link-in the coupling 4 with the chassis 100. This shaft 50 is considerably less costly than a recirculating-ball shaft of the same size, and helps to reduce the cost of the product when the effects of residual rotation about the axis Oy are insignificant.

In a third embodiment described in FIG. 4, the sliding link is, as in the first embodiment of the invention, a sliding link preventing any rotation about Oy. While the first embodiment provides this link by means of a sliding socket 12 rigidly connected to the coupling 6 and mounted movably on a shaft 5, the present embodiment provides the same sliding link by means of a sliding shaft 53 in two sockets 54 and 55, the rotation thereof being prevented. The other functions of the anti-rotation device 200 are performed using means identical to those in the first embodiment described in relation to FIGS. 1 and 2. A link such as the one shown in the kinematic diagram in FIG. 4 can be provided by a shaft 53 with a slot cooperating with a cam rigidly connected to the sockets 54 and 55. This embodiment provides an economic solution for large-diameter cables since the parts to be machined are limited to two zones equal in length to the maximum displacement of the screw rather than the total length of the shaft 53.

In a fourth embodiment shown in FIG. 5, the longitudinal guidance and anti-rotation functions of the guide yoke 7 are provided by two rollers 8 running in longitudinal slots 9 both located on the same side of the guide yoke 7. The other functions of the guide yoke 7 are performed using means identical to those in the third embodiment described in relation to FIG. 4. The sliding link is formed by sliding a shaft 53 within two sockets 54 and 55, while preventing the rotation thereof. This embodiment of the sliding link provides an economical solution for driving large-diameter cables.

The positioning of the two guide rollers 8 in guide slots 9 located on the same side of the guide yoke 7 helps to reduce overall size or enables the length of the cable or the rollers or the element to which the movement is to be transmitted to be increased, for example to prevent contamination of one of the elements by another (grease, dust, shavings, etc.) or to facilitate the replacement or maintenance of one of the mechanisms.

Finally, in a fifth embodiment shown in FIG. 6, the longitudinal guidance and anti-rotation functions of the guide yoke 7 are provided by two rollers 8 running in longitudinal slots 9 both located on the same side of the guide yoke 7. The other functions of the guide yoke 7 are performed using means identical to those in the first embodiment described in relation to FIG. 2. This solution combines the advantages of the first and third embodiments, thereby making the guidance and anti-rotation means more compact and using a single standardized element in the form of the splined shaft 5/socket 12 unit.

Naturally, the invention is not limited to the embodiments described, but covers all variants falling within the scope of the invention, as defined by the claims.

In particular, although the movement of the motor 1 is transmitted to the driving nut 3 via a notched belt 2, the invention also applies to other means of transmitting movement, such as using gears, smooth belts and direct drive;

although the driving element 3 is in this case a nut and the driven element 4 is a screw, the invention applies equally to an inverse control linkage comprising a driving screw and a driven nut;

although the screw jack is in this case coupled to a cable 11, the invention also applies to driving other elements such as a rigid rod or a cam;

although the driven cable 11 is in this case linked to the middle of the screw 4, the invention applies to other means of attaching the cable 11, such as at one of the extremities of the screw 4;

although in this case the driven screw 4 is hollow, the invention also applies to solid screws;

although in this case the axes of rotation of the two rollers 8 are parallel to one another and do not intersect with the longitudinal axis Ox, the invention also applies to any axes of rotation of the rollers 8, including axes that do not intersect with the longitudinal axis Ox, such as rollers 8 arranged in slots 9 having planes oriented orthogonally or in any other direction;

although in this case the guidance and anti-rotation means are guide rollers 8, the invention also applies to other guidance and anti-rotation means such as separate skids sliding along shafts parallel to the longitudinal axis Ox, rollers running in slots and magnetic links;

although in this case the guidance and anti-rotation means are provided by single means in the form of guide rollers 8 in longitudinal slots 9, the invention also applies to embodiments in which the guidance and anti-rotation means are two separate members, such as a guide rail running along the longitudinal axis coupled to a flat supporting element;

although the guidance and anti-rotation means are in this case two rollers 8, the invention also applies to a single roller or to a plurality of rollers.

The invention claimed is:

1. An anti-rotation device of an element driven about a longitudinal axis while enabling the driven element to move freely along this axis is provided, the device comprising:
   a guide yoke guided flat along a longitudinal plane parallel to the longitudinal axis of the element using guide means that prevent the guide yoke from rotating about the longitudinal axis and that enable the guide yoke to rotate about two axes perpendicular to the longitudinal axis and perpendicular to one another;
   a coupling member at one extremity of the driven element, the coupling member being linked to the guide yoke using linking means that enable a sliding link along a sliding axis substantially perpendicular to the longitudinal axis
   characterized in that the sliding axis does not intersect with the longitudinal axis.

2. The device as claimed in claim 1, in which the linking means enable rotation about the sliding axis.

3. The device as claimed in claim 1, in which the linking means include a splined recirculating-ball shaft.

4. The device as claimed in claim 1, in which the guide means include at least one roller rigidly attached to the guide yoke and running in a slot.

5. The device as claimed in claim 1, in which the guide means include a trolley with rollers each running in a related slot, the coupling member linking the trolley to the driven element by means of a sliding link the axis of which is orthogonal to the axis of the rollers.

6. The device as claimed in claim 5, in which the two slots are located on either side of the roller trolley.

7. The device as claimed in claim 5, in which the two slots are located on the same side of the roller trolley.

8. A screw jack including a screw driven along the longitudinal axis thereof by a driving nut, the driven screw being equipped with an anti-rotation device as claimed in claim 1.

9. A cable jack including a screw jack as claimed in claim 8, in which the driven screw is rigidly connected to the cable.

10. A cable jack according to claim 9, in which the driven screw is a hollow screw, the cable being rigidly connected to the driven screw and passing therethrough.

* * * * *